United States Patent
Shifman et al.

(10) Patent No.: US 10,303,451 B2
(45) Date of Patent: May 28, 2019

(54) SYSTEM, METHOD AND DEVICE FOR AUTOMATED INSTALLATION AND OPERATING ENVIRONMENT CONFIGURATION OF A COMPUTER SYSTEM

(71) Applicant: OSR Enterprises AG, Cham (CH)

(72) Inventors: Orit Shifman, Cham (CH); Elhanan Shifman, Petach Tikva (IL)

(73) Assignee: OSR ENTERPRISES AG, Cham (CH)

( * ) Notice: Subject to any disclaimer, the term of this patent is extended or adjusted under 35 U.S.C. 154(b) by 23 days.

(21) Appl. No.: 15/426,094

(22) Filed: Feb. 7, 2017

(65) Prior Publication Data

US 2017/0147317 A1    May 25, 2017

Related U.S. Application Data (63) Continuation-in-part of application No. PCT/EP2015/068161, filed on Aug. 6, 2015.
(Continued)

(51) Int. Cl.
*G06F 8/61* (2018.01)
*G06F 8/71* (2018.01)
(Continued)

(52) U.S. Cl.
CPC .......... *G06F 8/61* (2013.01); *G06F 8/71* (2013.01); *G06F 9/4406* (2013.01);
(Continued)

(58) Field of Classification Search
CPC ............ G06F 17/5009; G06F 17/5095; G06F 11/3688; G06F 11/2273; G06F 11/3684;
(Continued)

(56) References Cited

U.S. PATENT DOCUMENTS 7,441,236 B2 * 10/2008 Chon .................... G06F 11/261
714/E11.167
8,161,454 B2 * 4/2012 Srinivasan ................ G06F 8/76
717/106

(Continued)

OTHER PUBLICATIONS

Heidrich, Lukas, et al. "Hardware-in-the-loop test rig for integrated vehicle control systems." Proc. 7th IFAC Symp. Adv. Automot. Control. 2013. Retrieved on [Dec. 26, 2018] Retrieved from the Internet: URL<https://s3.amazonaws.com/academia.edu.documents/> (Year: 2013).*
(Continued)

*Primary Examiner* — Thuy Dao
*Assistant Examiner* — Cheneca Smith (57) ABSTRACT

A system, method and computer program product for installing a computer program within a computerized system of a car, the method comprising: installing a computer program on an emulator comprising a multiplicity of sub systems, each emulating a car sub system; executing a scenario from a scenario library, thereby activating at least one of the sub systems until a stopping criteria has been met; monitoring inputs and outputs transmitted to or received from any of the sub systems; and subject to said executing being completed successfully, installing the computer program on one or more car sub systems.

12 Claims, 3 Drawing Sheets

Related U.S. Application Data (60) Provisional application No. 62/034,173, filed on Aug. 7, 2014.

(51) Int. Cl.
    *G06F 9/4401*     (2018.01)
    *G06F 9/445*     (2018.01)
    *G06F 11/36*     (2006.01)

(52) U.S. Cl.
    CPC ........ *G06F 9/4411* (2013.01); *G06F 9/44505* (2013.01); *G06F 11/3664* (2013.01); *G06F 11/3688* (2013.01)

(58) Field of Classification Search
    CPC ............ G06F 11/3664; G06F 11/3692; G06F 11/263; G06F 11/3668; G06F 11/26; G06F 11/3447; G06F 11/2733; G06F 11/3457; G06F 9/455
    See application file for complete search history.

(56) References Cited

U.S. PATENT DOCUMENTS

| | | | | |
|---|---|---|---|---|
| 8,286,043 | B2* | 10/2012 | Sakada | G01R 31/005 324/762.01 |
| 9,282,110 | B2* | 3/2016 | Zhang | H04L 63/1408 |
| 2006/0212540 | A1* | 9/2006 | Chon | G06F 11/261 709/218 |
| 2006/0277010 | A1* | 12/2006 | Schutte | G05B 17/02 703/8 |
| 2007/0260438 | A1* | 11/2007 | Langer | G01M 17/007 703/8 |
| 2008/0126862 | A1* | 5/2008 | Pyska | G06F 11/3652 714/28 |
| 2008/0177554 | A1* | 7/2008 | Srinivasan | G06F 8/76 717/100 |
| 2009/0198396 | A1* | 8/2009 | Rodriguez | B60W 10/08 701/22 |
| 2010/0107025 | A1* | 4/2010 | Sakada | G01R 31/005 714/733 |
| 2012/0101791 | A1* | 4/2012 | Komatsu | G05B 17/02 703/6 |
| 2013/0311128 | A1* | 11/2013 | Takano | G06F 11/3684 702/123 |
| 2014/0025365 | A1* | 1/2014 | Kajitani | G06F 17/5009 703/24 |
| 2015/0150124 | A1* | 5/2015 | Zhang | H04L 63/1408 726/22 |

OTHER PUBLICATIONS

Hernandez, Unai, et al. "Vehicle on board platform: Communications test and prototyping." Intelligent Vehicles Symposium (IV), 2010 IEEE. IEEE, 2010. Retrieved on [Dec. 26, 2018] Retrieved from the Internet: URL<https://ieeexplore.ieee.org/abstract/document/5548037> (Year: 2010).*

\* cited by examiner

SYSTEM, METHOD AND DEVICE FOR AUTOMATED INSTALLATION AND OPERATING ENVIRONMENT CONFIGURATION OF A COMPUTER SYSTEM

RELATED APPLICATIONS

This application is a continuation-in-part of PCT Application No. PCT/EP2015/068161, filed Aug. 6, 2015 and claims the benefit of U.S. Provisional Application No. 62/034,173, filed Aug. 7, 2014; the applications are incorporated herein by reference in their entirety to provide continuity of disclosure.

TECHNICAL FIELD

Embodiments disclosed herein relate to devices, systems and methods for secure installation and configuration of computer programs in general, and more particularly to safe installation of programs on dedicated devices such as car systems.

BACKGROUND

As computer technology has become more widely spread and affordable over the years, it has also become more complex as it provides an ever increasing number of functions and tasks that need to be accomplished locally or remotely, for instance by devices, systems, local servers, desktop computers, and/or remotely by employing cloud-based computing.

Before a computer system can be put into use, a slate of software products, including an operating system has to be installed and configured. Due to the high complexity, the installation and configuration of software products and operating environments is an arduous, costly and time-consuming task. Therefore, the installation and configuration of such systems is usually performed by skilled information technology IT professionals that make numerous configuration decisions in order to ensure the interoperability of the system's various computerized devices. However, manual installation is labor intensive and takes significant time and human resources.

Together with the declared functionality, many programs contain computer code that causes intentional or unintentional side effects, which may harm not only the specific sub-system associated with the program but also other such systems. In particular, when installing programs on a car sub system, due the sensitivity of some sub systems, such as the brakes or the steering mechanism, such side effects may be disastrous. The danger of intentionally harmful components is also introduced by cyberattacks, in which an attacker attacks the system using a bug, a loophole, or due to insufficiently careful handling by one or more users.

BRIEF SUMMARY

One exemplary embodiment of the disclosed subject matter is a system for installing a computer program within a computerized system of a car, comprising: an emulator comprising a multiplicity of sub-system each emulating a corresponding car sub system; a scenario library storing one or more scenarios to be executed, thereby activating one or more of the sub systems; a scenario execution module for executing one or more scenarios stored in the scenario library, thereby activating the one or more sub systems; and an installer configured to install a computer program on the emulator. Within the system, the installer is optionally further configured to install the computer program on a car. Within the system, the emulator optionally comprises: a scenario management module for storing one or more scenarios for testing the sub systems within the scenario library; a scenario execution module for executing the scenarios, thereby activating the sub systems; and a monitoring module for observing incoming and outgoing instructions to and from the sub system. Within the system, each of the systems optionally comprises: a model of the corresponding car sub system; and an interface for communicating with other sub-systems or with the scenario execution module. Within the system, the scenario library optionally comprises a script for activating one or more scenarios. Within the system, the script optionally comprises instructions of activation parameters for the scenarios. Within the system, the scenario library optionally comprises a stopping criteria for one or more scenarios or scripts. Within the system, the car sub system is optionally selected from the group consisting of: an engine; a gear; steering mechanism; entertainment system; air conditioning; and headlight and signaling system.

Another exemplary embodiment of the disclosed subject matter is a method for installing a computer program within a computerized system of a car, comprising: installing a computer program on an emulator comprising a multiplicity of sub systems, each emulating a car sub system; executing a scenario from a scenario library, thereby activating at one or more of the sub systems until a stopping criteria has been met; monitoring inputs and outputs transmitted to or received from any of the sub systems; and subject to said executing being completed successfully, installing the computer program on oat least one car sub systems. Within the method, the stopping criteria is optionally selected from the group consisting of: a problem has been discovered; a problem has been discovered which cannot be tolerated in accordance with a required car security level; an unauthorized message has been sent or received; a message has been sent or received from an unauthorized source or at a wrong time; a predetermined period of time has lapsed; each sub system was operative for at least a predetermined period; and each sub system received or output at least a predetermined number of instructions or indications. Within the method, installing the computer program optionally comprises: executing, by one or more special-purpose processors, a set of instructions of a dedicated installation and configuration computer program product, wherein execution of the set of instructions results in an implementation of a booting engine which installs and configures a plurality of operating modules of the operating environment.

Yet another exemplary embodiment of the disclosed subject matter is a computer program product comprising a computer readable storage medium retaining program instructions, which program instructions when read by a processor, cause the processor to perform a method comprising: installing a computer program on an emulator comprising a multiplicity of sub systems, each emulating a car sub system; executing a scenario from a scenario library, thereby activating at least one of the sub systems until a stopping criteria has been met; monitoring inputs and outputs transmitted to or received from any of the sub systems; and subject to said executing being completed successfully, installing the computer program on one or more car sub systems.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The following description relates to automated booting devices, systems and methods for the safe installation and configuration of a computerized environment.

The term "emulator" used in this specification should be expansively construed to cover any kind of hardware or software that enables a computer system (the "host") to behave like another computer system (the "guest"). An emulator typically enables the host system to run software or use peripheral devices designed for the guest system. Emulation may refer to the ability of a computer program executed by an electronic device to imitate another program or device. Common uses include enabling the usage of software written for the guest system, such as printers, computer games, or the like. A hardware emulator is an emulator which takes the form of a hardware device.

Modern systems such as cars utilize a multiplicity of processors and other computerized components in many of their systems. The systems include non-critical systems such as the entertainment system, but also critical systems such as brakes, steering, cruise control, distance maintenance, or the like. In many cases, problems are solved or new features are introduced to any of the sub systems by installing software components in one or more of the car systems, for example as software updates.

Thus, one problem handled by the disclosed subject matter relates to the safety of the car sub systems in the presence of software components installations. For example, a car manufacturer, a repair shop, or any user may wish to install a newer version or an add-on to the entertainment system software. However, the entertainment system software may comprise harmful computer code which can damage the entertainment system, and moreover other sub systems of the car, including critical systems. The harmful code may be unintentional, e.g. a bug, or intentional, e.g., a virus designed to cause such damage, for example take control over such sub system and send instructions which may be wrong, unauthorized, badly timed, or the like, for example lock the brakes, send incorrect steering commands, damage the display such that the driver may over speed, activate the blinkers, or the like. Further problems may be due to bugs in the operating system which may cause unexpected and possibly dangerous behavior when loaded with a specific program.

The safety of systems may also be endangered by cyber-attacks which may intrude a system via an installed program or via a loophole or other bugs. Cyberattacks can cause tremendous damage by taking over the car, activating code in hazardous manner, collecting information, or the like.

Another problem handled by the disclosed subject matter relates to the need of an easy and seamless installation of systems, and in particular systems such as computerized systems and components within a car.

One technical solution to the problem relates to avoiding the dangers encompassed in hardware or software components intended to be installed in a car, wherein the components have not been fully tested and found safe. The solution comprises creating an emulator emulating various systems of a car, and installing the components on these emulators. The components are then executed and the input and output of various sub systems may be monitored, until sufficient testing has been performed, or until another stopping criteria has been met, for example a problem has been detected.

Once the components have been executed on the emulator without any problems, or at least no severe problems have been discovered, it may be assumed that the components are safe, and can be installed on actual cars.

Installation can be carried out automatically in order to reduce the installation time labor required for manual installation, in particular when the components need to be installed on a multiplicity of cars.

Figure 1:
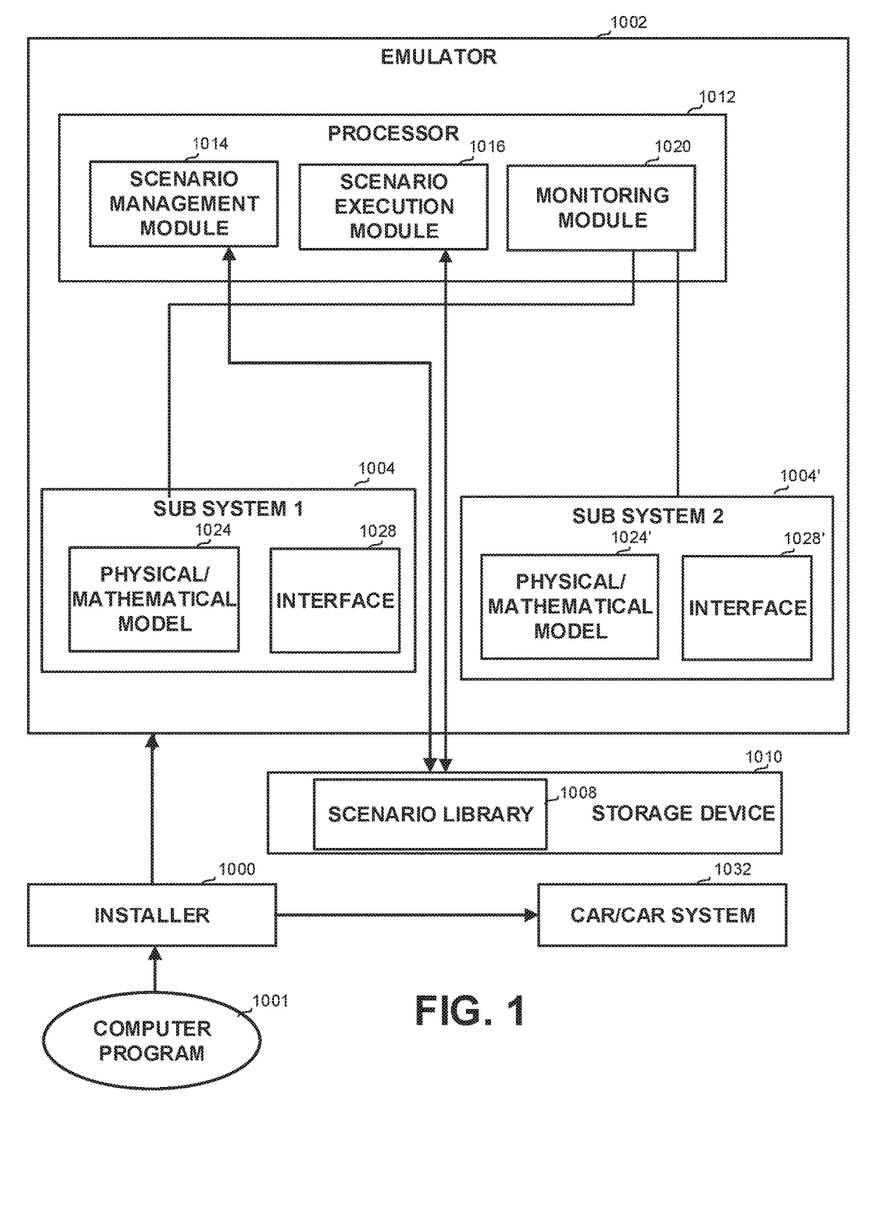
FIG. 1 shows a generalized block diagram of a system for safe installation of computer programs on car systems, in accordance with some exemplary embodiments of the subject matter.

Referring now to FIG. 1, showing a generalized block diagram of a system for safe installation of computer programs on car systems.

The system comprises an installer 1000 which receives a computer program 1001, such as an executable, a library, an application, an add-on, or the like, to be installed within a car or a car sub system. Installer 1000 can be implemented as booting device 3200 of FIG. 3 below, but is not limited to such installer, and any other manual, automatic, or semi-automatic installer may be used.

The system further comprises an emulator 1002, emulating a multiplicity of systems within a car.

Emulator 1002 is optionally a computing platform comprising one or more processors 1012 and one or more storage devices 1010, each of which may be volatile or non-volatile.

Emulator 1002 comprises a multiplicity of sub-systems, such as sub system 1 (1004) and sub system 2 (1004'), each emulating at least one car sub system, or part thereof. Some exemplary non-limiting sub systems include the engine, gear, steering mechanism, entertainment system, headlight and signaling system, air conditioning, or others. It will be appreciated that although FIG. 1 shows two subsystems, this is not a limitation and the actual number of sub systems may be significantly larger.

Thus, each sub system comprises a physical or mathematical model, such as model 1024 of sub system (1004) or model 1024' of sub system 2 (1004').

Each sub system further comprises an interface, such as interface 1028 of sub system 1 (1004) or interface 1028' of sub system 2 (1004'). Each sub system communicates with, e.g., receives instructions and provides output or instructions to other sub systems or to scenario execution module 1016 through its respective interface.

Installer 1000 can also be configured to install computer program 1001 on any of sub system 1004, 1004'.

Emulator 1002 is associated with, for example stores on a storage device such as storage device 1010 or another, a scenario library 1008, comprising one or more sets of computer instructions for activating one or more of subsystems 1004, 1004'. scenario library 1008 may comprise scenarios such as accelerating, braking, changing lanes with or without activating the blinkers, fueling the car, changing stations on the radio, or the like.

Emulator 1002 can comprise a processor 1012, which can be any general purpose or dedicated processor. The processor can be configured to execute several functional modules in accordance with computer-readable instructions stored on a non-transitory computer-readable memory associated with processor 1012, such as storage device 1010. Such functional modules are referred to hereinafter as comprised in processor 1012. The functional modules comprised in.

Processor 1012 can comprise scenario management module 1014 for determining or receiving instructions indicating which scenario(s) stored in scenario library 1008 may be executed, and with what execution parameters such as what duration, time, order, parallelism, randomness degree or the like. Scenario management module 114 can receive from a user or assist a user in preparing one or more scripts for executing the scenarios. Scenario management module 1014 can further determine one or more stopping criteria for stopping the scenario execution. The stopping criteria can be but is not limited to any of the following non-limiting examples: a problem has been discovered and in particular an unauthorized message has been sent or received, a message has been sent from an unauthorized source or at a wrong time, a predetermined period of time has lapsed, each subsystem was operative for at least a predetermined period, each subsystem received or transmitted at least a predetermined number of instructions or indications, or the like. The stopping criteria may depend on the security car level required. The level may be component-dependent, for example while a problem with the engine may not be tolerated, a problem confined to the entertainment system may.

Processor 1012 can comprise scenario execution module 1016 for executing scenarios from scenario library 1008 in accordance with the parameters as determined by scenario management module 1014. Scenario execution module 1016 can monitor the scenario execution by monitoring interfaces 1028, 1028' and observing incoming and outgoing instructions to and from each sub system 1004, 1004'.

The scenarios may be executed in any predetermined or random order or a combination thereof, continuously or intermittently, or the like, as determined by scenario management module 1014. The scenarios can be executed and monitored until a stopping criteria as defined is met.

Processor 1012 can comprise monitoring module 1020 for monitoring the inputs and outputs transmitted to or received from any of sub systems 1004, 1004'. Thus, monitoring module 1020 can examine each such message or instruction and determine whether an unexpected message, a message from an unauthorized source, or a message sent on unexpected timing is received and from which source, and thus determine whether installed computer program 1001 caused harmful or risky behavior. For example, computer program 1001 which is installed on the car radio, is not supposed to send any message to any other system, and in particular not to any critical system, such as the engine, gear, steering, or even the blinker.

Once the scenarios have been executed until one or more stopping criteria are met, depending on the parameters, then if no problems or unexpected behaviors have been observed, for example the required car security level is complied with, installer 1000 can install computer program 1001 on the actual car or car system 1032. Otherwise, if a problem has been met, computer program 1001 will not be installed on the car or car system 1032, and the source of the problem can be investigated.

It will be appreciated that installer 1000, as detailed in association with FIG. 3 below, can be operative in installing computer program 1001 on a multiplicity of cars, in an autonomous manner that requires less time and human resources than manual installation.

Figure 2:
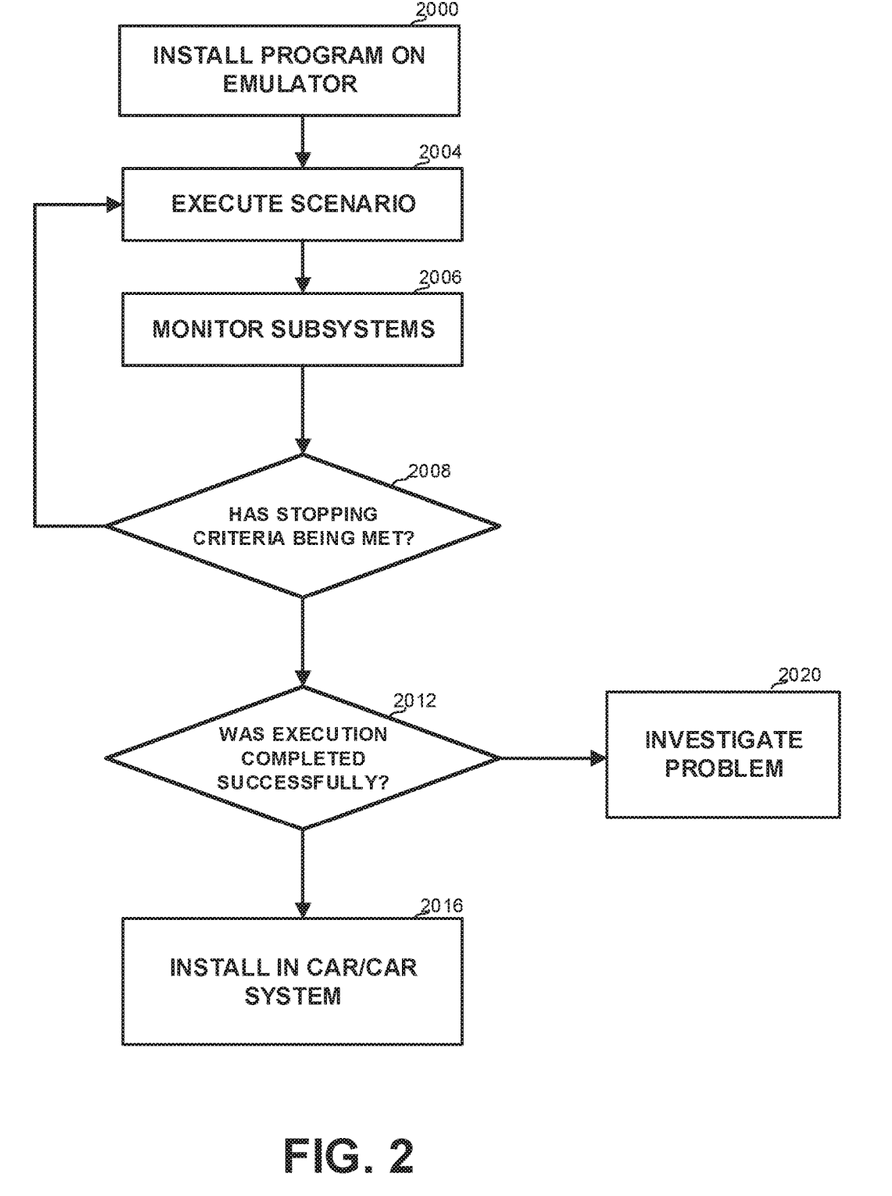
FIG. 2 shows a generalized flowchart of a method for safe installation of a computer program on car systems, in accordance with some exemplary embodiments of the subject matter.

Referring now to FIG. 2, showing a generalized flowchart of a method for safe installation of a computer program on a car.

Installer 1000 can install (block 2000) a computer program, or a component thereof such as a library, on emulator 1002. The computer program or parts thereof may be installed on one or more subsystems of emulator 1002.

Scenario execution module 1016 can execute (block 2004) one or more scenarios as received, determined or stored by scenario management module 1014.

Throughout the execution (block 2004), monitoring module can monitor (block 2006) the execution and determine whether a stopping criteria has been met (block 2008). Monitoring may comprise checking ingoing and outgoing instructions to and from every sub systems and verifying that instructions are received from authorized sources, on correct timing. If, for example, an instruction is sent to the engine from the entertainment system, or from the blinking system, a problem may be present. Monitoring incoming and outgoing instructions or messages may also be used for detecting cyberattacks which cause one or more components to act in an unauthorized manner, receive instructions from an unauthorized source or transmit instructions in unauthorized manner, or the like.

When a stopping criteria has been met, it can be determined (block 2012) whether execution has been completed successfully, i.e., whether computer program 1001 is considered to be safe. This may be the case, for example, if all required scenarios have been executed for the required duration or the required functionality and no problem has been detected. If the computer program is safe, then it can be installed (block 2016) on a car or a car system. Otherwise, if a problem occurred, the source of the problem can be investigated (block 2020).

Figure 3:
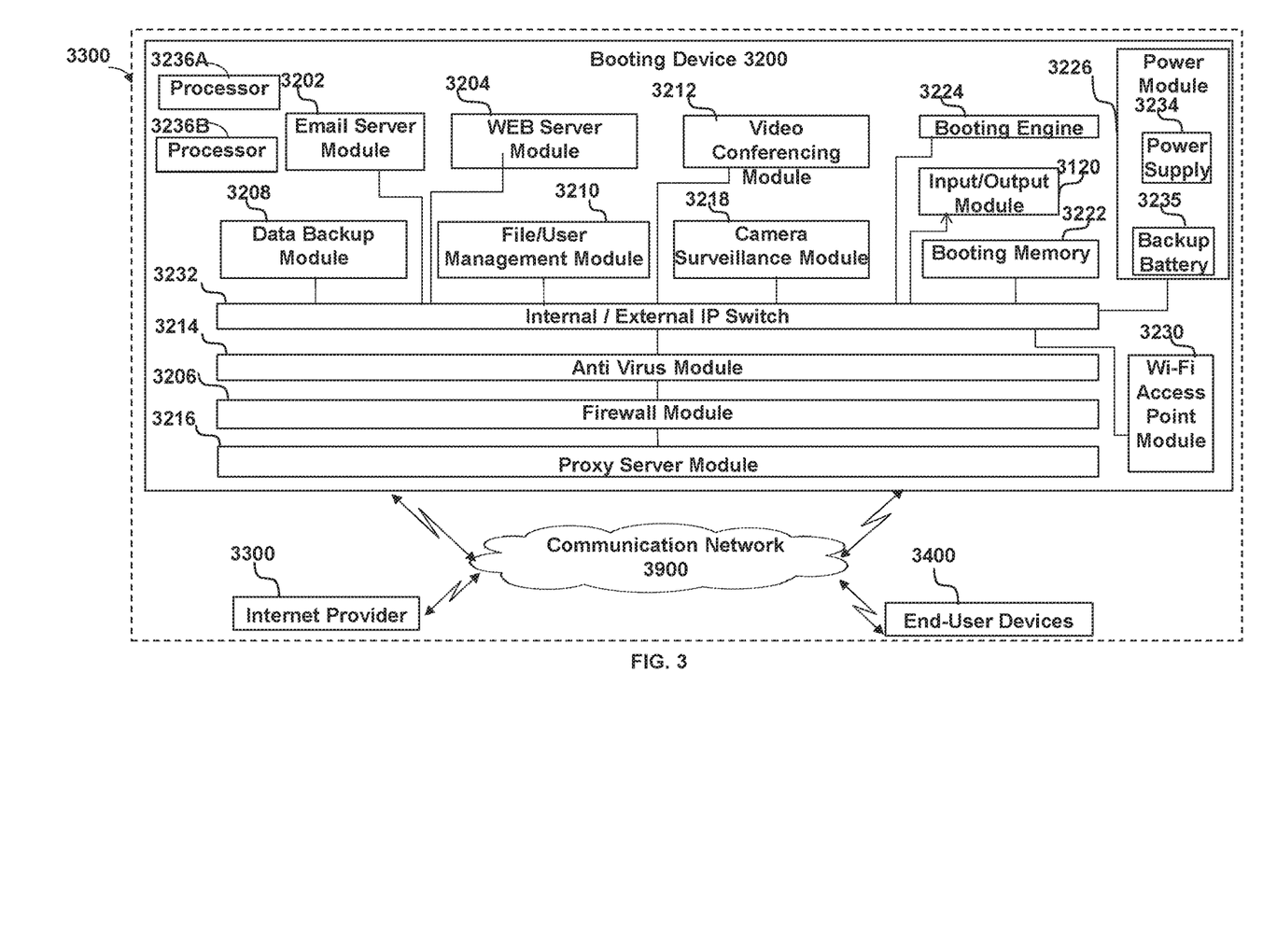
FIG. 3 shows a detailed block diagram of an installation system, in accordance with some exemplary embodiments of the subject matter.

Referring to FIG. 3, showing a computerized system 3000 for installing a program on a multiplicity of user devices 3400, wherein one or more such user devices may be a car. System 3000 may be an embodiment of installer 1000 of FIG. 1. System 3000 may include an Internet Provider 3300, and a booting device 3200 that enables the automated installation and/or configuration of software and/or modules to render the various parts and/or devices of computerized system 3100 operable. Booting device 3200 may for example include a plurality of operating modules including, e.g., an email server module 3202, a web server module 3204, a firewall module 3206, a data backup module 3208, a file/user management module 3210, a video conferencing module 3212, an anti-virus module 3214, a proxy server module 3216 and/or a surveillance module 3218, which may be a closed-circuit camera surveillance module; and a Wi-Fi access point module 3230.

Web server module 3204 may include a webdesign module (not shown) for assisting the administrator in designing a business webportal associated with computerized system 3100. Booting device 3200, internet provider 3300 and end-user device(s) 3400 may be configurable to communicate with one another over a communication network 3900. In general, data may be provided from internet provider 3300 and/or clients 3400 over network 3900 and pass proxy server module 3216, firewall module 3206, antivirus module 3214 and an internal/external IP switch 3232 for assigning the data to the respective modules (e.g., tasks) of booting device 3200. (and to connect to the external PC clients (if not via Wi-Fi))

Booting device 3200 may employ a plurality of embedded or special-purpose processors 3236 (e.g., 3236A and 3236B) that employ, e.g., reduced-instruction set computing (RISC) architecture or any other processor architecture (e.g., ARM® processors) that allows embedded or special-purpose implementation by the processors of booting device 3200.

In embodiment, booting device 3200 the processors comprised in booting device 3200 may only or solely be special-purpose processors. Booting device 3200 may thus be free of any general-purpose processors. In an embodiment, booting device 3200 comprises only processors that solely employ RISC architecture.

In an embodiment, the plurality of special-purpose processors, when executing a set of instructions stored in a storage device (not shown) of booting device 3200, may result in the execution of the aforementioned modules. In other words, the modules may be implemented by a plurality of (e.g., RISC or CISC) special purpose processors or groups of special purpose processors executing a respective set of instructions. In an embodiment, the modules may solely be implemented by a plurality of (e.g., RISC or CISC) special purpose processors or groups of special purpose processors executing a respective set of instructions.

In some embodiments, each module may be implemented by a respective dedicated special-purpose processor and/or dedicated group of special-purpose processors such that a special-purpose processor or group of special-purpose processors employed for the implementation of a first module is not employed, even partially, for the implementation of a second module. In other words, booting device 3200 may be considered to be a computerized device that employs a plurality of dedicated embedded processors (suitable processor dependent on the module function) for implementing processes and/or functions of the modules. The special-purpose processors used for implementing the modules may be mounted onto single motherboard (not shown) included booting device 3200.

Booting device 3200 may include an input/output module 3220 embodying, for example, a graphic and/or audio user interface, for guiding an administrator of booting device 3200 to configure the modules and the operating environment of system 3100. Booting device 3200 may further include a power module 3226 enabling the powering the various modules. Power module 3226 may include a power supply 3234 (e.g., for connecting booting device 3200 to an electric grid) and, optionally, a power backup battery 3235 implemented, for example, by an uninterruptible power source or UPS for providing backup in case of power supply failure received by power supply 3234 from a power grid. Booting device 3200 may further include a communication module (not shown).

In an embodiment, the modules of booting device 3200 are pre-installed, thereby obviating the need of installing any additional software that may otherwise be required for the configuration of system 3100.

Booting device 3200 is configured such that the powering thereof causes the initiation of a predetermined system configuration sequence, which may be executed fully automatically (also: "automatic mode") or semi-automatically (also: "semi-automatic mode"), as outlined herein below. In an embodiment, booting device 3200 is selectively operable in the automatic or semi-automatic operating mode. The terms "mode" and "operating mode" may be used interchangeably. The configuration sequence may include, in an initial process, the operable connection of booting device 3200 with internet provider 3300. When in the automatic mode, booting device 3200 may automatically detect that it is connected with internet provider 3300 and provide the latter with the necessary identifiers (e.g., Internet Protocol (IP) address associated with booting device 3200). When set to operate in the semi-automatic mode, input/output module 3220 may prompt the administrator to provide the IP address/or to give authorization to make use of the detected IP address. In the automatic mode, authorization of the detected IP address occurs by default. Once connected, in the semi-automatic mode, input module may present the administrator with a web-based configuration interface and prompt him/her to enter the static IP address and, optionally, authorization credentials such as the Username and Password that was obtained by the administrator from Internet provider 3300. Correspondingly, booting device 3200 may guide the administrator in the configuration of web server module 3204. In the automatic mode, the static IP-Address may be automatically detected by booting device 3200.

In an embodiment, in the automatic mode, authorization credentials may be assigned automatically. For instance, based on pre-stored names of users, usernames may be created automatically. In an embodiment, passwords and/or other challenge-response authentication protections may be automatically created (e.g., randomly or in a pseudo-random manner), and respectively assigned to the automatically created usernames.

It is noted that the terms "associated" and "assigned" may be used interchangeably.

Once authorized, in the semi-automatic mode, booting device 3200 may prompt the administrator to define Wi-Fi access. In the automatic mode, default definitions may be assigned by booting device 3200 defining the Wi-Fi Access.

Thereafter, in the semi-automatic mode, booting device 3200 may prompt the administrator, all via user interface 3220, to configure the users' mailbox addresses (i.e., Email server module 3202) and further prompt the administrator to associate an electronic file (i.e., configure file/user management module 3210) and allocate backup storage for data created by the users of system 3100 (i.e., configure data backup module 3208). In the (fully) automatic mode, the users' mailbox addresses may be defined automatically (e.g., based on a pre-stored domain and the usernames). In the automatic mode, electronic file association as well as allocation of backup storage to each one of the users may be accomplished according to predefined default settings.

In addition, booting device 3200 may prompt the administrator to define the system permission and/or authorization for the users of system 3100. For that purpose, booting device 3200 may present the administrator with a variety of options and/or permission levels (e.g., enabling or disabling remote access) via input/output module 3120 configurable and respectively assignable to users of end-user devices 3400 by the administrator. Moreover, booting device 3200 may prompt the administrator to define the configurations of firewall module 3206, antivirus module 3214, proxy server module 3216 and camera surveillance module 3218. In an embodiment, in the automatic mode, a default authorization and/or security level may be associated with each username, along with a default configuration file/user management configuration. For instance, in the automatic mode, system permission and/or authorization may be defined identically for each "regular" user according to predefined settings. However, the system permission and/or authorization definitions may be different for a user who is identified as "administrator" than for the "regular" or non-administrator user(s). The permission/authorization definitions for a user defined as "administrator" may also be configured automatically according to predefined settings. In an embodiment, various permission/authorization configuration settings may be predefined by booting device 3200 and presented to the administrator for assigning respective different levels of authorization. Moreover, in the automatic mode, firewall module 3206, antivirus module 3214, proxy server module 3216 and camera surveillance module 3218, may be automatically configured according to predefined settings stored in booting memory 3222.

In some embodiments, in the semi-automatic mode, booting device 3200 may prompt the administrator to configure videoconferencing module 3212. Additional or alternative modules may be configurable by booting device 3200 via user interface 3220 to ensure proper operability of system 3100. In the automatic mode, default settings may be predefined and employed for configuring videoconferencing module 3212.

All configurations and services of system 3100, except those that are pre-defined by internet provider 3300, may be definable at and/or through booting device 3200 via user interface 3220 without the need of employing cloud-based services for example. Considering the aforesaid, optionally excluding storage, booting device 3200 alone may fully incorporate and provide a full gamut of server functionalities and services of a computerized system such as, e.g., system 3100, for example, of a business environment. In an embodiment, storage may exclusively be incorporated in a local server (not shown). In an embodiment, in the automatic mode, the automated installation and operating environment configuration may, for example, take about 60 minutes or less, 45 minutes or less, 30 minutes or less, 20 minutes or less, 15 minutes or less, 10 minutes or less, or 5 minutes or less, for, e.g., 20 end-user devices 3400 or less.

In an embodiment, in the automatic mode, the automated installation and operating environment configuration may, for example, take about 60 minutes or less, 45 minutes or less, 30 minutes or less, 20 minutes or less, 15 minutes or less, 10 minutes or less, or 5 minutes or less, for, e.g., 30, 40, 50, 60, or 100 end-user devices 3400 or less.

The average setup time per end-user device 3400 may thus be the total time divided by the number of end-user devices 3400 automatically installed and configured by booting device 3200 according to any of the above-noted examples.

In an embodiment, the average automatic installation and configuration time per end-user device 3400 for establishing a system like system 3100 may thus for example be 3 minutes or less, 2 minutes or less, 2.25 minutes or less, 1.5 minutes or less, 1.125 minutes or less, 1 minute or less, 0.75 minutes or less, 0.66 minutes or less, 0.5 minutes or less, 0.375 minutes or less, 0.33 minutes or less; 0.25 minutes or less, 0.15 minutes or less; or 0.125 minutes or less.

A booting memory 3222 of booting device 3200 may include a set of instruction which, when executed e.g. by the respective (e.g., RISC) processors, may cause the execution of the method, process and/or operation automated and/or guided installation and configuration of computerized system 3100. Such method, process and/or operation may herein be implemented by a booting engine 3224 coordinating the configuration sequence for the different modules. The set of instructions may be of a dedicated and particular software that may be web-based. The set of instructions of the dedicated software may be executed by the booting device to install and configure all of the modules of the system according to the requirements and/or constraints imposed, for example, by the administrator and/or clients 3400 (e.g. via a web-based GUI). In some embodiments, the modules may be set up independently from one another by executing respective sets of instructions of various software.

In an embodiment, computerized system 3100 may refer to a system comprised in a vehicular device, such as, for example, an operating system of a car; a stationary device; and/or in a residence. In an embodiment, booting device 3200 may be onboard a vehicle (not shown) and operative to provide, for example, guidance for setting up an operating system of the vehicle including, for example, a vehicle entertainment and/or communication system.

In an embodiment, booting device 3200 may be employed for setting up of building automation (e.g., alarm system, motion detectors, temperature sensors, humidity sensors, fire alarm sensors, air-conditioning systems, lighting, an entertainment and/or communication system, surveillance cameras, watering, pet feeding and/or the like. Reverting to FIG. 3, home automation configuration by booting device 3200 shall not be construed to be limited to surveillance module 3218 for instance.

In an embodiment, components of booting device 3200 may be housed in a ruggedized casing (not shown) allowing booting device 3200 to be deployable and employable under harsh environmental conditions.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system or device (e.g., Computerized System 3100) can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein.

The term "non-transitory" is used to exclude transitory, propagating signals, but to otherwise include any volatile or non-volatile computer memory technology suitable to the application.

A computer program product can be deployed to be executed on one computer or on multiple computers at one site or distributed across multiple sites and interconnected by a communication network.

Computer executable instructions implementing an embodiment of a method disclosed herein can be distributed to users on a non-transitory computer-readable medium and are often copied onto a hard disk or other storage medium. When such a program of instructions is to be executed, it is usually loaded into the random access memory of the computer, thereby configuring the computer to act in accordance with a method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing embodiments of a method disclosed herein.

The term "engine" may comprise or be implemented one or more computer modules, wherein a module may be a self-contained hardware and/or software component that interfaces with a larger system (Alan Freedman, The Computer Glossary 268, (8th ed. 1998)). Such module may be embodied by a circuit or a controller programmed to cause the system to implement the method, process and/or operation as disclosed herein. A module comprises a machine or machines executable instructions. For example, a module may be implemented as a hardware circuit comprising, e.g., custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Where applicable, although flow charts and block diagrams may be used to describe embodiments, the technique is not limited to those charts or to the corresponding descriptions. For example, flow need not move through each illustrated box or state, or in exactly the same order as illustrated and described.

It should be understood that where the claims or specification refer to "a" or "an" element, such reference is not to be construed as there being only one of that element.

Unless otherwise stated, the use of the expression "and/or" between the last two members of a list of options for selection indicates that a selection of one or more of the listed options is appropriate and may be made.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for installing a computer program within a computerized system of a car, the car comprising a plurality of sub-systems including at least an engine and a steering mechanism, the method comprising:
    installing a computer program on an emulator comprising a multiplicity of emulator sub systems, including at least a first emulator sub-system emulating the engine and a second emulator sub-system emulating the steering mechanism, wherein each of the first emulator sub-system and the second emulator sub-system comprises a mathematical model and an interface for communicating with other emulator sub-systems or with the scenario execution module, and wherein installing the computer program on the emulator comprises installing a firewall;
    wherein installing the computer program comprises: executing, by at least one special-purpose processor, a set of instructions of a dedicated installation and configuration computer program product, wherein execution of the set of instructions results in an implementation of a booting engine which installs and configures a plurality of operating modules of the operating environment;
    executing a scenario from a scenario library, thereby activating at least the first emulator sub-system and the second emulator sub-system until a stopping criteria has been met, the at least one scenario comprising a computer program;
    storing at least one scenario for testing the at least one of the plurality of sub-systems within the scenario library;
    monitoring inputs and outputs transmitted to or received from any of the first emulator sub-system and the second emulator sub-system; and
    subject to said executing being completed successfully, installing the computer program on the car, thereby ensuring that the at least one scenario is safe for the plurality of the sub-systems.

2. The method of claim 1, wherein the stopping criteria is selected from the group consisting of: a problem has been discovered; a problem has been discovered which cannot be tolerated in accordance with a required car security level; an unauthorized message has been sent or received; a message has been sent or received from an unauthorized source or at a wrong time; a predetermined period of time has lapsed; each sub system was operative for at least a predetermined period; and each sub system received or output at least a predetermined number of instructions or indications.

3. The method of claim 1, wherein the at least one scenario is ensured to be free of cyberattacks.

4. The method of claim 1, wherein the at least one scenario is ensured to be free of bugs.

5. A system for installing a computer program within a computerized system of a car, the car comprising a plurality of sub-systems including at least an engine and a steering mechanism, the system comprising:
    an emulator stored in a memory comprising a multiplicity of emulator sub-systems, including at least a first emulator sub-system emulating the engine and a second emulator sub-system emulating the steering mechanism;
    wherein the emulator comprises:
    a scenario management module for storing at least one scenario for testing the at least one of the plurality of sub-systems within the scenario library; and a monitoring module for observing incoming and outgoing instructions to and from the first emulator sub-system and the second emulator sub-system;

a scenario library storing at least one scenario to be executed, the at least one scenario comprising a computer program;

an installer configured to install the computer program on the emulator;

wherein installing the computer program comprises: executing, by at least one special-purpose processor, a set of instructions of a dedicated installation and configuration computer program product, wherein execution of the set of instructions results in an implementation of a booting engine which installs and configures a plurality of operating modules of the operating environment;

a scenario execution module for executing the at least one scenario stored in the scenario library, thereby activating at least the first emulator sub-system and the second emulator sub-system; and the installer configured to install the computer program on the car, subject to the at least one scenario being executed successfully wherein no problem is detected, wherein installing the computer program on the emulator comprises installing a firewall, thereby ensuring that the at least one scenario is safe for the plurality of the sub-systems, wherein each of the first emulator sub-system and the second emulator sub-system comprises a mathematical model and an interface for communicating with other emulator sub-systems or with the scenario execution module.

6. The system of claim 5, wherein the scenario library comprises a script for activating at least one scenario.

7. The system of claim 6, wherein the script comprises instructions of activation parameters for the at least one scenario.

8. The system of claim 5, wherein the scenario library comprises a stopping criteria for at least one scenario or script.

9. The system of claim 5, wherein the emulator further comprises at least one emulator sub system selected from the group consisting of: a gear emulator sub-system; an entertainment system emulator sub-system; an air conditioning emulator sub-system; and a headlight and signaling emulator sub-system.

10. The system of claim 5, wherein the at least one scenario is ensured to be free of cyberattacks.

11. The system of claim 5, wherein the at least one scenario is ensured to be free of bugs.

12. A computer program product comprising a computer readable storage medium retaining program instructions, which program instructions when read by a processor, cause the processor to perform a method comprising:

in a car comprising a plurality of sub-systems including at least an engine and a steering mechanism, installing a computer program on an emulator comprising a multiplicity of emulator sub-systems, including at least a first emulator sub-system emulating the-engine and a second emulator sub-system emulating the steering mechanism, wherein each of the first emulator sub-system and the second emulator sub-system comprises a mathematical model and an interface for communicating with other emulator sub-systems or with the scenario execution module, and wherein installing the computer program on the emulator comprises installing a firewall;

wherein installing the computer program further comprises: executing, by at least one special-purpose processor, a set of instructions of a dedicated installation and configuration computer program product, wherein execution of the set of instructions results in an implementation of a booting engine which installs and configures a plurality of operating modules of the operating environment;

executing a scenario from a scenario library, thereby activating at least the first emulator sub-system and the second emulator sub-system until a stopping criteria has been met systems, the at least one scenario comprising a computer program;

storing at least one scenario for testing the at least one of the plurality of sub-systems within the scenario library;

monitoring inputs and outputs transmitted to or received from any of the first emulator sub-system and the second emulator sub-system; and subject to said executing being completed successfully, installing the computer program on the car thereby ensuring that the at least one scenario is safe for the at least one of the sub-systems, thereby ensuring that the at least one scenario is safe for the plurality of the sub-systems.

* * * * *